US012614818B2

(12) United States Patent
Morishita

(10) Patent No.: US 12,614,818 B2
(45) Date of Patent: Apr. 28, 2026

(54) BUSBAR CONFIGURED TO RESTRICT SPREADING OF A CORROSION INHIBITOR AND BATTERY MODULE COMPRISING THE SAME

(71) Applicant: SANYO Electric Co., Ltd., Osaka (JP)

(72) Inventor: Taijyu Morishita, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 742 days.

(21) Appl. No.: 17/905,639

(22) PCT Filed: Oct. 20, 2020

(86) PCT No.: PCT/JP2020/039440

§ 371 (c)(1),
(2) Date: Sep. 5, 2022

(87) PCT Pub. No.: WO2021/181740

PCT Pub. Date: Sep. 16, 2021

(65) Prior Publication Data

US 2023/0116400 A1 Apr. 13, 2023

(30) Foreign Application Priority Data

Mar. 11, 2020 (JP) ................................. 2020-041621

(51) Int. Cl.
| | |
|---|---|
| *H01M 50/507* | (2021.01) |
| *H01M 10/48* | (2006.01) |
| *H01M 50/522* | (2021.01) |
| *H01M 50/571* | (2021.01) |

(52) U.S. Cl.
CPC ....... *H01M 50/507* (2021.01); *H01M 10/482* (2013.01); *H01M 50/522* (2021.01); *H01M 50/571* (2021.01)

(58) Field of Classification Search
CPC ............. H01M 50/507; H01M 50/571; H01M 50/522; H01M 10/482
See application file for complete search history.

(56) References Cited

U.S. PATENT DOCUMENTS

| | | | |
|---|---|---|---|
| 2014/0363711 A1 | 12/2014 | Zhao | |
| 2015/0221921 A1 | 8/2015 | Choi et al. | |
| 2016/0073506 A1* | 3/2016 | Coakley | H01M 50/522 156/60 |
| 2016/0197330 A1 | 7/2016 | Takase et al. | |

(Continued)

FOREIGN PATENT DOCUMENTS

| | | |
|---|---|---|
| CN | 105308770 A | 2/2016 |
| EP | 3005442 A1 | 4/2016 |

(Continued)

OTHER PUBLICATIONS

International Search Report of PCT application No. PCT/JP2020/039440 dated Dec. 28, 2020.

(Continued)

*Primary Examiner* — Kimberly Wyluda
(74) *Attorney, Agent, or Firm* — WHDA, LLP

(57) ABSTRACT

Busbar includes joining surface to which a voltage detection line is to be joined, and position restriction part provided on at least a part of a periphery of joining surface and configured to restrict spreading of a corrosion inhibitor that covers joining surface.

3 Claims, 5 Drawing Sheets

10

(56)     References Cited

U.S. PATENT DOCUMENTS

| | | | |
|---|---|---|---|
| 2018/0123188 A1 | 5/2018 | Dawley et al. | |
| 2018/0130989 A1* | 5/2018 | Saito .................... | H01M 50/51 |
| 2018/0219204 A1 | 8/2018 | Takase et al. | |
| 2019/0189994 A1 | 6/2019 | Narayanan et al. | |
| 2020/0243830 A1 | 7/2020 | Tanaka et al. | |

FOREIGN PATENT DOCUMENTS

| | | |
|---|---|---|
| JP | 2006-344572 | 12/2006 |
| JP | 2015-133394 | 7/2015 |
| JP | 2015-141765 A | 8/2015 |
| JP | 2016-524289 | 8/2016 |
| JP | 2017-027831 | 2/2017 |
| WO | 2014/197647 | 12/2014 |
| WO | 2017/018278 A1 | 2/2017 |
| WO | 2018/168982 | 9/2018 |
| WO | 2018/180270 A1 | 10/2018 |

OTHER PUBLICATIONS

English translation of CN Search Report dated Feb. 23, 2024, issued in counterpart EP Applicant No. 202080094097.0. (3 pages).
Extended (Supplementary) European Search Report dated Jun. 24, 2024, issued in counterpart EP application No. 20923825.2. (7 pages).

* cited by examiner

2

10

BUSBAR CONFIGURED TO RESTRICT SPREADING OF A CORROSION INHIBITOR AND BATTERY MODULE COMPRISING THE SAME

TECHNICAL FIELD

The present invention relates to a busbar and a battery module.

BACKGROUND ART

A battery module is known as a power source that is used, for example, for a vehicle and needs to output a high voltage. The battery module includes a plurality of cells electrically connected to each other. In such a battery module, adjacent cells are electrically connected to each other via a busbar. Additionally, for example, as disclosed in PTL 1, each busbar includes a voltage detection line attached thereto for detecting a voltage between the cells.

CITATION LIST

Patent Literature

PTL 1: Unexamined Japanese Patent Publication No. 2017-27831

SUMMARY OF THE INVENTION

In order to increase safety of the battery module, it is required to accurately detect the voltage between the cells. Thus, it is desirable to increase connection reliability between the voltage detection line and the busbar.

The present invention has been made in view of such circumstances, and an object of the present invention is to provide a technique for increasing connection reliability between a voltage detection line and a busbar.

One aspect of the present invention provides a busbar. The busbar includes a joining surface to which a voltage detection line is to be joined, and a position restriction part that is provided on at least a part of a periphery of the joining surface and configured to restrict spreading of a corrosion inhibitor that covers the joining surface.

Another aspect of the present invention provides a battery module. The battery module includes: a plurality of cells; the busbar according to the one aspect, the busbar being configured to electrically connect the plurality of cells to each other; and a voltage detection line that is joined to the busbar and configured to detect voltages of the plurality of cells.

Note that, optional combinations of the above-described constituent elements, and implementations of the present invention in the form of method, apparatus, system, and the like are also practiced as additional modes of the present invention.

According to the present invention, the connection reliability between the voltage detection line and the busbar can be increased.

DESCRIPTION OF EMBODIMENT

Figure 1:
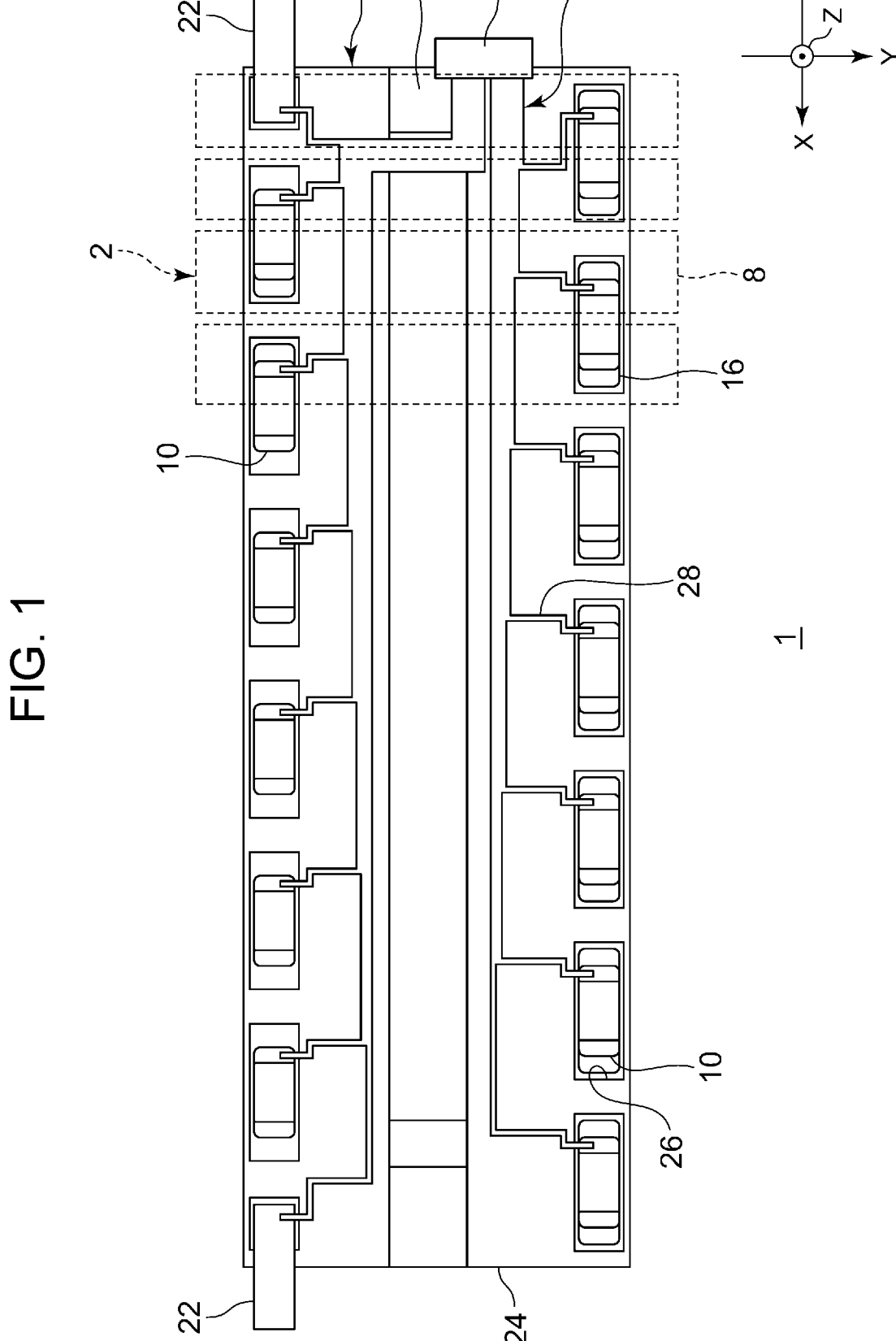
FIG. 1 is a plan view of a battery module according to an exemplary embodiment.

Hereinafter, the present invention will be described based on a preferred exemplary embodiment with reference to the drawings. The exemplary embodiment is not intended to limit the invention but is an example, and all features described in the exemplary embodiment and combinations thereof are not necessarily essential to the invention. The same or equivalent constituent elements, members, and processing illustrated in the drawings are denoted by the same reference numerals, and a redundant description will be omitted as appropriate. Furthermore, scales and shapes of parts illustrated in the drawings are determined for the sake of easy description, and the scales or shapes should not be interpreted as limitation unless otherwise mentioned. Unless otherwise mentioned, terms such as "first" and "second" as used in the specification or claims do not represent any order or importance but are intended to distinguish one configuration from another configuration. In each drawing, some members, which are not important for describing the exemplary embodiment, are omitted.

Figure 2:
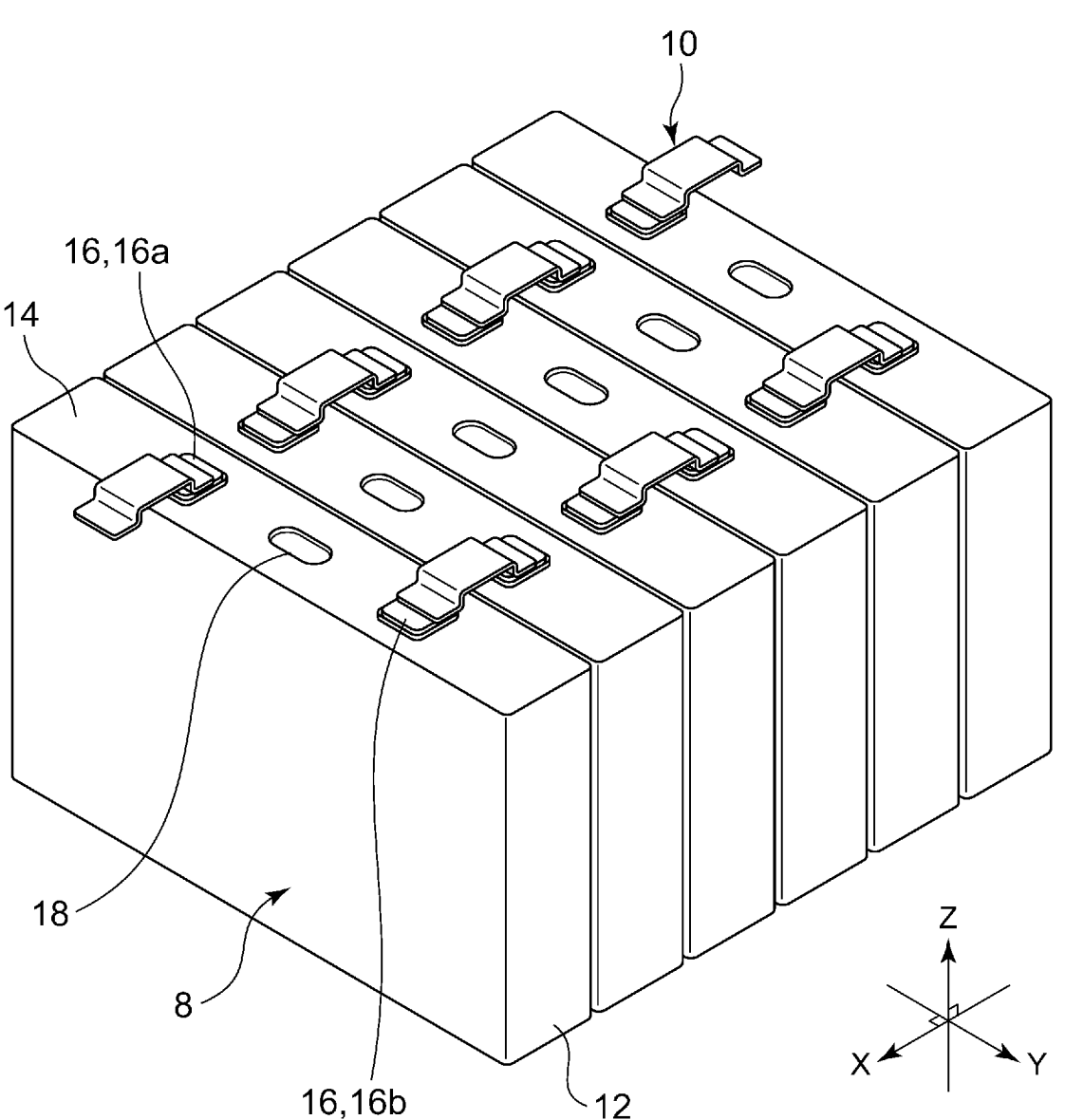
FIG. 2 is a perspective view of a part of a cell stack.

FIG. 1 is a plan view of a battery module according to an exemplary embodiment. FIG. 2 is a perspective view of a part of a cell stack. Note that, in FIG. 1, only some cells in the cell stack are illustrated by broken lines. FIGS. 1 and 2 schematically illustrate shapes of output terminals and busbars.

Battery module 1 includes cell stack 2, duct plate 4, and voltage detection line 6. Cell stack 2 includes a plurality of cells 8 that are arranged and a plurality of busbars 10 that electrically connect cells 8 to each other. Each of cells 8 is, for example, a rechargeable secondary cell such as a lithium-ion cell, a nickel-metal-hydride cell, or a nickel-cadmium cell. Each cell 8 is a so-called prismatic cell, and has outer covering can 12 having a flat rectangular parallelepiped shape. Outer covering can 12 has, on its one surface, a substantially rectangular opening (not illustrated) through which an electrode assembly, an electrolyte, and the like are to be accommodated in outer covering can 12. Substantially rectangular sealing plate 14 is fitted into the opening of outer covering can 12 such that sealing plate 14 closes the opening.

Sealing plate 14 is provided with a pair of output terminals 16. Specifically, sealing plate 14 is provided, near its one longitudinal end, with positive-electrode terminal 16a, and near its other longitudinal end, with negative-electrode terminal 16b. Hereinafter, when it is unnecessary to distinguish polarities of the pair of output terminals 16 from each other, positive-electrode terminal 16a and negative-electrode terminal 16b are collectively referred to as output terminals 16.

Outer covering can 12, sealing plate 14, and output terminals 16 are each a conductive member, and are each made of metal such as aluminum, iron, or stainless steel. Outer covering can 12 and sealing plate 14 are joined to each other by, for example, laser welding. Each of output terminals 16 is inserted into a corresponding one of through-holes provided in sealing plate 14. Between each of output termi- nals 16 and a corresponding one of through-holes, an insulating sealing member is interposed. Outer covering can 12 may be covered with an insulating film, not illustrated, such as a shrink tube. Alternatively, outer covering can 12 and sealing plate 14 may each be made of a resin having an insulating property.

Each cell 8 has valve 18 on sealing plate 14. Valve 18 is disposed between the pair of output terminals 16 of sealing plate 14. Valve 18 is also referred to as a safety valve. Valve 18 is configured to open when an internal pressure of cell 8 rises and exceeds a predetermined value, thus releasing an internal gas of cell 8. Valve 18 includes, for example, a thin part provided in a part of sealing plate 14 and thinner than the other part, and a linear groove provided on a surface of the thin part. In this configuration, when the internal pres- sure of cell 8 rises, the thin part tears from the groove as a starting point, so that valve 18 opens. Valve 18 of each cell 8 is connected to gas duct 20 to be described later. The internal gas of cell 8 is discharged from valve 18 to gas duct 20.

In the description of the present exemplary embodiment, for convenience, sealing plate 14 corresponds to an upper surface of cell 8, and a bottom surface of outer covering can 12 disposed on a side opposite to sealing plate 14 corre- sponds to a lower surface of cell 8. Cell 8 also has four side surfaces connecting the upper surface and the lower surface to each other. Two of the four side surfaces are a pair of long side surfaces connected to two opposing long sides of sealing plate 14. Each long side surface is a surface having the largest area among the surfaces of cell 8, that is, a main surface. The remaining two side surfaces, excluding the two long side surfaces, are a pair of short side surfaces connected to short sides of sealing plate 14.

Furthermore, for convenience, in cell stack 2, an upper- surface of cell 8 corresponds to an upper surface of cell stack 2, a lower-surface side of cell 8 corresponds to a lower surface of cell stack 2, a surface formed by a group of the short side surfaces of cells 8 corresponds to a long side surface of cell stack 2, and in cell stack 2, a long-side- surface side of cell 8 corresponds to a short side surface of cell stack 2. These directions and positions are defined for convenience. Thus, for example, the part defined as the upper surface in the present invention does not necessarily mean a part located above the part defined as the lower surface.

The plurality of cells 8 are arranged at a predetermined distance from each other such that the main surfaces of adjacent ones of the plurality of cells 8 face each other. In the present exemplary embodiment, cells 8 are arranged horizontally. Hereinafter, as appropriate, a direction in which cells 8 are arranged is referred to as first direction X, a horizontal direction intersecting first direction X is referred to as second direction Y, and a vertical direction intersecting first direction X and second direction Y is referred to as third direction Z. In the present exemplary embodiment, first direction X, second direction Y, and third direction Z are directions perpendicular to each other.

Each cell 8 is disposed such that output terminals 16 are directed in the same direction. In the present exemplary embodiment, each cell 8 is disposed such that output termi- nals 16 are directed upward in the vertical direction. When adjacent cells 8 are connected in series, cells 8 are arranged such that positive-electrode terminal 16a of one cell 8 and negative-electrode terminal 16b of another cell 8 are adja- cent to each other. When adjacent cells 8 are connected in parallel, cells 8 are arranged such that positive-electrode terminal 16a of one cell 8 and positive-electrode terminal 16a of another cell 8 are adjacent to each other.

A separator, not illustrated, is disposed between two adjacent cells 8. The separator electrically insulates two cells 8 from each other. The separator is also referred to as an insulating spacer and is made of a resin sheet having an insulating property, for example. Examples of a resin used for the separator include resins such as polypropylene (PP), polybutylene terephthalate (PBT), polycarbonate (PC), and a Noryl (registered trademark) resin (modified poly(phe- nylene ether) (PPE)).

The plurality of cells 8 are held between a pair of end plates, which are not illustrated, in first direction X. The pair of end plates are adjacent to cells 8 located at both ends in first direction X with the separator interposed between each end plate and each cell 8. Each end plate is a metal sheet made of metal such as iron, stainless steel, or aluminum.

The plurality of cells 8 are bound in first direction X by a pair of binding members not illustrated. The pair of binding members are also referred to as binding bars and are long members elongated in first direction X. The pair of binding members are arranged in second direction Y, for example. Each binding member is made of metal such as iron or stainless steel.

The plurality of cells 8 are held between the pair of end plates in first direction X while being alternately arranged with the plurality of separators. The pair of binding members are disposed so as to hold the plurality of cells 8, the plurality of separators, and the pair of end plates in second direction Y. Each binding member is fixed, at its both ends, to the pair of end plates. For example, the binding members each have, at its both ends in first direction X, bent parts overlapping with the main surfaces of the end plates. The bent parts are fixed to the end plates by screwing or the like. The plurality of cells 8 are positioned in first direction X while being bound in first direction X by the pair of binding members. The separators, the end plates, and the binding members have known structures, and thus, illustrations and detailed descriptions thereof will be omitted.

Output terminals 16 of adjacent cells 8 are electrically connected to each other via busbars 10. Busbars 10 are each an approximately belt-shaped metal member. Busbars 10 of the present exemplary embodiment are each made of alu- minum. Each of busbars 10 has one end connected to positive-electrode terminal 16a of one of two adjacent cells 8, and the other end connected to negative-electrode termi- nal 16b of the other of two adjacent cells 8. Note that, using busbars 10, output terminals 16 having the same polarity in the plurality of cells 8 disposed adjacently to each other may be connected in parallel to each other to form cell blocks, and the cell blocks may be connected in series to each other. Furthermore, external connection terminals 22 are con- nected to output terminals 16 of outermost cells 8 in first direction X. External connection terminals 22 are each connected to an external load not illustrated.

Duct plate 4 is placed on the upper surface of cell stack 2. Duct plate 4 is a plate-shaped member that covers the upper surface of cell stack 2, that is, surfaces on which valves 18 of respective cells 8 are disposed. Duct plate 4 includes base plate 24, a plurality of openings 26, and gas duct 20. Base plate 24 is elongated along the upper surface of cell stack 2. The plurality of openings 26 and gas duct 20 are provided in base plate 24.

The plurality of openings 26 are provided at positions overlapping with output terminals 16 of cells 8 in third direction Z to expose output terminals 16. Busbars 10 are placed on respective openings 26. The plurality of busbars 10 are supported by duct plate 4. Thus, duct plate 4 also functions as a so-called busbar plate.

Gas duct 20 is a flow path into which gas ejected from each cell 8 flows. Base plate 24 has a plurality of openings not illustrated, through which valves 18 are exposed, at positions corresponding to valves 18 on respective cells 8. Gas duct 20 is elongated in first direction X and overlaps respective valves 18 in third direction Z. Respective valves 18 communicate with gas duct 20 through the openings on base plate 24.

Duct plate 4 of the present exemplary embodiment is made of a resin such as polypropylene (PP), polybutylene terephthalate (PBT), polycarbonate (PC), or Noryl (registered trademark) resin (modified PPE) except for a top surface of gas duct 20 facing respective valves 18. The top surface of gas duct 20 is made of a metal plate such as iron or aluminum.

Voltage detection line 6 is placed on duct plate 4. Thus, duct plate 4 also functions as a support plate that supports voltage detection line 6. Voltage detection line 6 is a member for detecting voltages of the plurality of cells 8. Voltage detection line 6 includes a structure in which a plurality of conductive wires 28 are assembled. Conductive wires 28 of the present exemplary embodiment are each made of copper.

Each conductive wire 28 is connected at its one end to connector 30, and at its other end to a corresponding one of busbars 10. Thus, each busbar 10 and connector 30 are electrically connected. Additionally, some of conductive wires 28 electrically connect external connection terminal 22 to connector 30. Connector 30 is connected to an external battery electric control unit (ECU), for example. The battery ECU controls sensing of the voltage or the like of each cell 8, charging and discharging of each cell 8, and the like.

Figure 3:
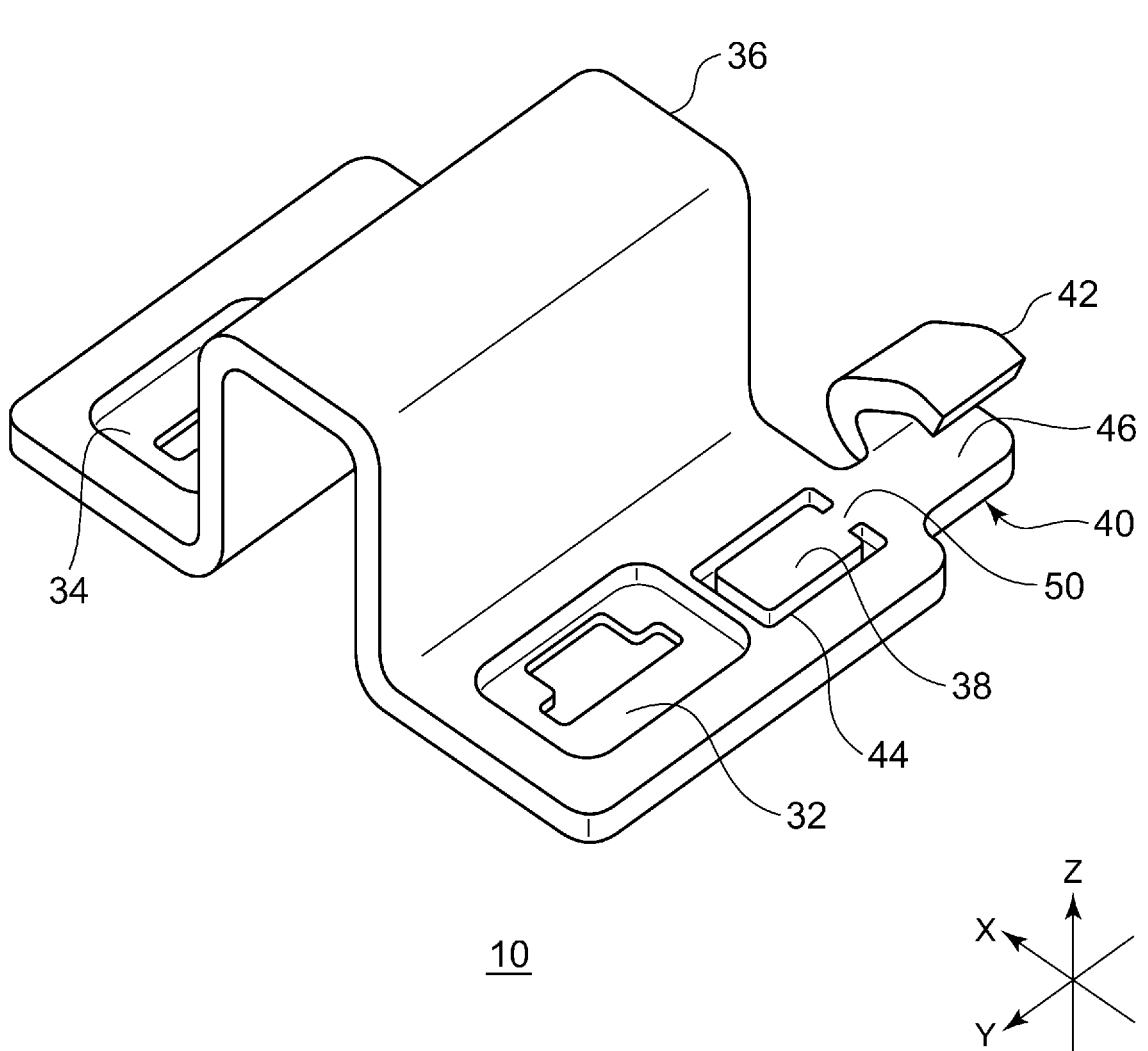
FIG. 3 is a perspective view of a busbar according to the exemplary embodiment.
Figure 4A:
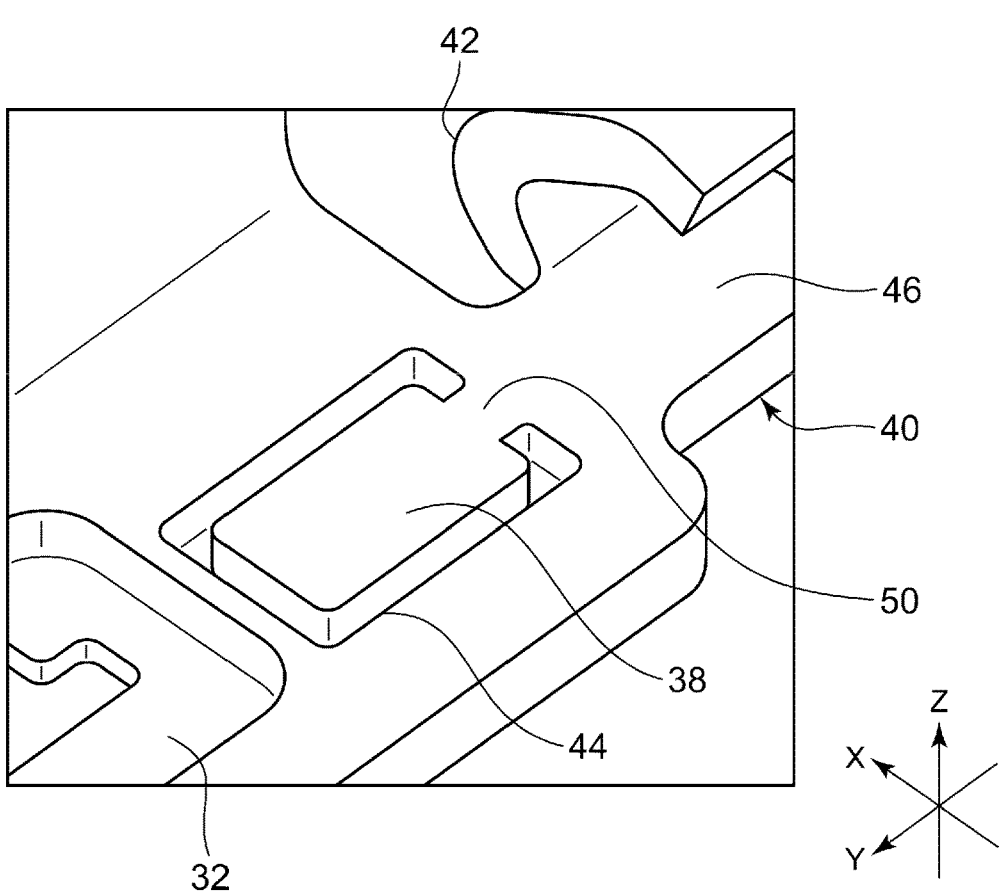
FIG. 4A is an enlarged perspective view illustrating a region including a joining surface of the busbar.
Figure 4B:
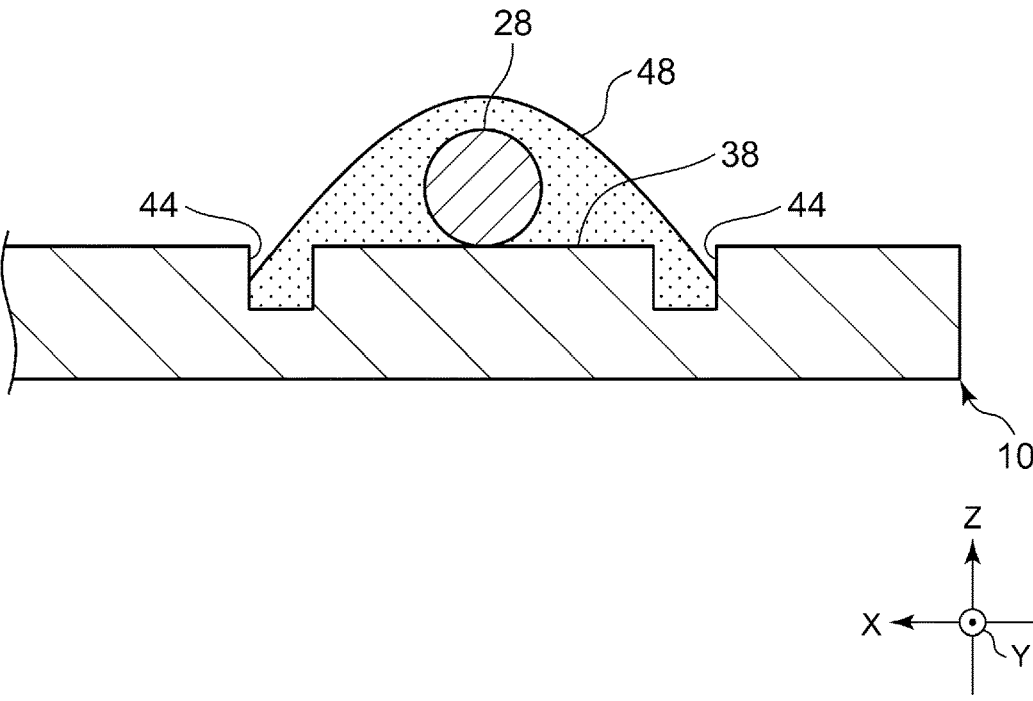
FIG. 4B is a schematic sectional view of the busbar to which a voltage detection line is joined.

FIG. 3 is a perspective view of busbar 10 according to the exemplary embodiment. FIG. 4A is an enlarged perspective view illustrating a region including a joining surface of busbar 10. FIG. 4B is a schematic sectional view of busbar 10 to which voltage detection line 6 is joined. Busbar 10 includes first connection part 32, second connection part 34, coupling part 36, joining surface 38, support part 40, clip part 42, and position restriction part 44.

First connection part 32 is located near one end of busbar 10 having a belt shape, and is electrically connected to corresponding output terminal 16 of one of two adjacent cells 8. Second connection part 34 is located near the other end of busbar 10, and is electrically connected to corresponding output terminal 16 of the other of two adjacent cells 8. First connection part 32 and second connection part 34 are joined to output terminals 16 by, for example, laser welding or ultrasonic bonding.

Coupling part 36 couples first connection part 32 to second connection part 34. Coupling part 36 of the present exemplary embodiment has a curved shape protruding in third direction Z. Thus, coupling part 36 has a substantially U-shape as viewed in second direction Y. Coupling part 36 is elastically deformed in response to relative displacement between cell 8 to which first connection part 32 is connected and cell 8 to which second connection part 34 is connected. This can absorb the relative displacement between two cells 8.

Joining surface 38 is a surface to which conductive wire 28 of voltage detection line 6 is joined. Joining surface 38 of the present exemplary embodiment is provided at a position adjacent to first connection part 32, as an example. Joining surface 38 is a flat surface facing opposite to cell stack 2. Conductive wire 28 is joined to joining surface 38 by performing a process such as ultrasonic bonding in a state where a distal end of conductive wire 28 is placed on joining surface 38.

Support part 40 supports a neck close to the distal end of conductive wire 28. Support part 40 has placement surface 46 continuous from joining surface 38. Placement surface 46 is flush with joining surface 38. This can cause at least the distal end and the neck of conductive wire 28 to be elongated linearly.

Clip part 42 is an arch-shaped member and is disposed to cover placement surface 46. Clip part 42 is coupled at its one end to support part 40. Clip part 42 can be pivoted with the one end as a fulcrum to move toward and away from placement surface 46. Clip part 42 is fitted at its the other end into support part 40 in a state where clip part 42 is close to placement surface 46. This restricts pivotal movement of clip part 42. With clip part 42 being fitted at its the other end into support part 40, the neck of conductive wire 28 is held between placement surface 46 and an inner surface of clip part 42. In this manner, conductive wire 28 is fixed.

Joining surface 38 to which the distal end of conductive wire 28 is joined is covered with corrosion inhibitor 48. An example of corrosion inhibitor 48 includes a liquid corrosion inhibitor in which a resin such as a silicon resin, an epoxy resin, or a urethane resin is dispersed in a solvent. Corrosion inhibitor 48 is subjected to a predetermined curing treatment to become a corrosion preventing layer.

In the present exemplary embodiment, busbar 10 is made of aluminum, conductive wire 28 is made of copper. Therefore, joining surface 38 and conductive wire 28 are joined to each other by a method of joining dissimilar metals. In this case, when water adheres a joint between joining surface 38 and conductive wire 28, galvanic corrosion (electrolytic corrosion) occurs between the dissimilar metals. This may cause increased resistance between busbar 10 and conductive wire 28 or detachment of conductive wire 28 from busbar 10. In particular, in a case where, for example, a vehicle on which battery module 1 is mounted travels in a coastal area, sea water may adhere to the joint, and electrolytic corrosion is more likely to occur. To address such a situation, joining surface 38 is coated (potted) with corrosion inhibitor 48 to cover the joint. This can reduce occurrence of electrolytic corrosion at the joint between joining surface 38 and conductive wire 28.

Position restriction part 44 is provided on at least a part of a periphery of joining surface 38 and configured to restrict spreading of corrosion inhibitor 48 that covers joining surface 38. Position restriction part 44 of the present exemplary embodiment is a recess recessed from joining surface 38 in a thickness direction (third direction Z in the present exemplary embodiment) of busbar 10. Coating of corrosion inhibitor 48 to joining surface 38 around which position restriction part 44 is not provided may lead to the possibility that due to excessive spreading of corrosion inhibitor 48, a coating thickness becomes insufficient or uneven. In this case, strength of the corrosion preventing layer composed of corrosion inhibitor 48 becomes insufficient in at least a part. Thus, due to vibration or the like during use of battery module 1, cracks may occur in the corrosion preventing layer or the corrosion preventing layer may be detached from joining surface 38. Additionally, if the coating thickness of corrosion inhibitor 48 is insufficient, a part of conductive wire 28 is exposed, and a corrosion preventing function of the corrosion preventing layer may be impaired.

To address such a situation, the recess serving as position restriction part 44 is provided around joining surface 38. This can restrict the spreading of corrosion inhibitor 48 coated to joining surface 38 to the outside of the recess. As a result, the joint between joining surface 38 and conductive wire 28 can be covered with a sufficient amount of corrosion inhibitor 48.

Busbar 10 of the present exemplary embodiment has non-formation region 50 not including position restriction part 44 between joining surface 38 and placement surface 46. Non-formation region 50 can provide a flat surface from placement surface 46 to joining surface 38. Placement of conductive wire 28 on this flat surface can maintain a linear state from the neck to the distal end of conductive wire 28, thus increasing the connection reliability between conductive wire 28 and joining surface 38.

As described above, busbar 10 according to the present exemplary embodiment includes joining surface 38 to which voltage detection line 6 is to be joined, and position restriction part 44 provided on at least a part of the periphery of joining surface 38 and configured to restrict spreading of corrosion inhibitor 48 that covers joining surface 38. By surrounding the periphery of joining surface 38 with position restriction part 44, the joint between joining surface 38 and voltage detection line 6 can be more stably protected by corrosion inhibitor 48. This can increase connection reliability between voltage detection line 6 and busbar 10.

Furthermore, battery module 1 according to the present exemplary embodiment includes: the plurality of cells 8; busbar 10 configured to electrically connect the plurality of cells 8 to each other; and voltage detection line 6 that is joined to busbar 10 and configured to detect voltages of the plurality of cells 8. This configuration can increase the safety of battery module 1.

Furthermore, position restriction part 44 of the present exemplary embodiment is the recess recessed from joining surface 38 in the thickness of busbar 10. Since position restriction part 44 is the recess, position restriction part 44 can be easily formed from the metal plate by press working or the like.

According to the present exemplary embodiment, voltage detection line 6 includes conductive wire 28 that is to be joined to joining surface 38 and made of copper, and busbar 10 is made of aluminum. Thus, conductive wire 28 and joining surface 38 are joined to each other by a method of joining dissimilar metals, and the joint between conductive wire 28 and joining surface 38 is prone to be corroded by occurrence of electrolytic corrosion. To address such a situation, joining surface 38 is covered with corrosion inhibitor 48 to protect the joint. This can further increase connection reliability between voltage detection line 6 and busbar 10. Additionally, since busbar 10 is made of aluminum, it is possible to reduce weight and cost of busbar 10 and eventually battery module 1.

The exemplary embodiment of the present invention has been described in detail above. The above-described exemplary embodiment is merely a specific example for implementing the present invention. The contents of the exemplary embodiment do not limit the technical scope of the present invention, and many design changes such as changes, additions, and deletions of constituent elements can be made without departing from the spirit of the invention defined in the claims. Any new exemplary embodiment to which design changes have been made will provide advantageous effects of the exemplary embodiment and modified examples that are combined. In the above-described exemplary embodiment, with respect to the contents where such design changes can be made, the contents are emphasized with expressions such as "of the present exemplary embodiment" and "in the present exemplary embodiment". However, design changes are allowed even with respect to the contents without such expressions. Optional combinations of constituent elements included in the exemplary embodiment are also practiced as additional modes of the present invention.

First Modified Example

Figure 5A:
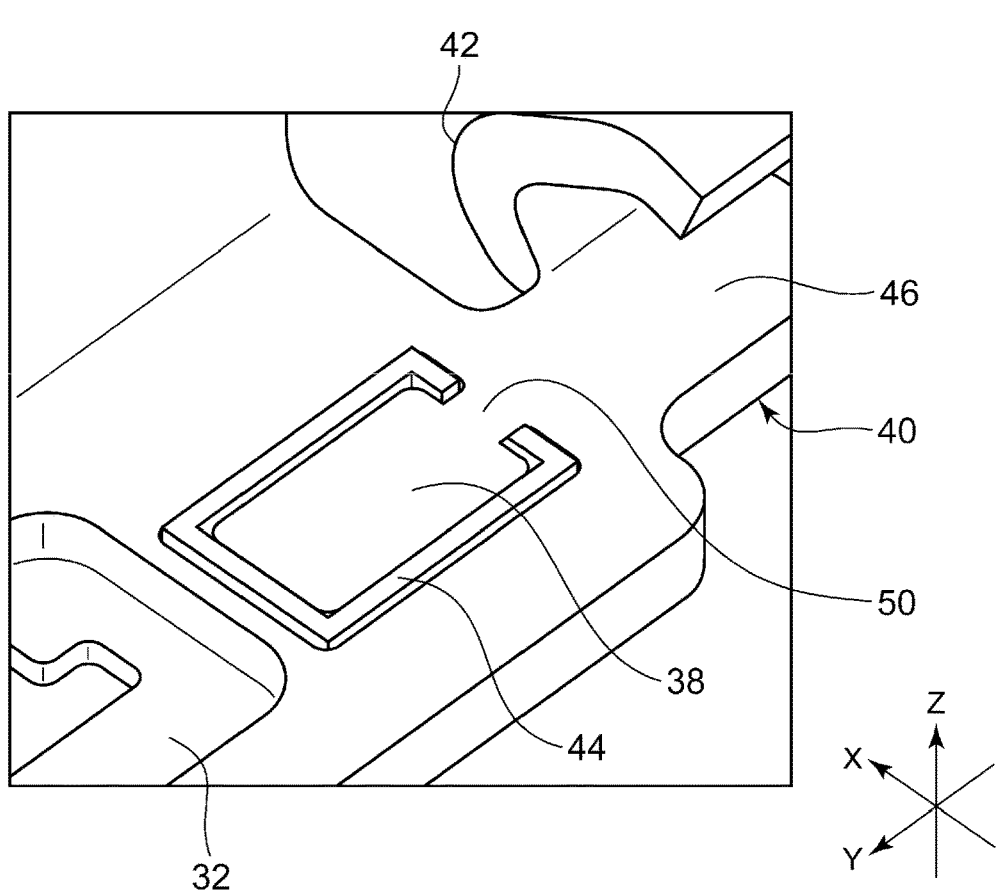
FIG. 5A is an enlarged perspective view illustrating a region including a joining surface of a busbar according to a first modified example.
Figure 5B:
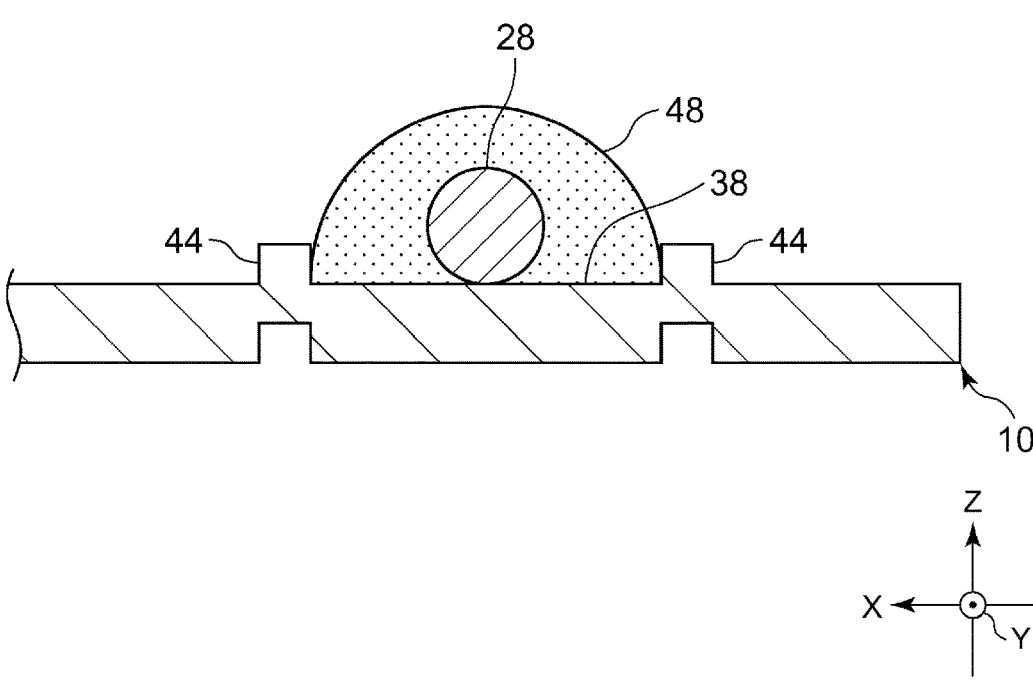
FIG. 5B is a schematic sectional view of the busbar to which a voltage detection line is joined.

FIG. 5A is an enlarged perspective view illustrating a region including joining surface 38 of busbar 10 according to a first modified example. FIG. 5B is a schematic sectional view of busbar 10 to which voltage detection line 6 is joined. Position restriction part 44 of the exemplary embodiment is the recess, but position restriction part 44 of the present modified example is a protrusion protruding from joining surface 38 in the thickness of busbar 10.

The protrusion serving as position restriction part 44 provided around joining surface 38 can restrict the spreading of corrosion inhibitor 48 coated to joining surface 38 to the outside of the protrusion. Additionally, position restriction part 44 which is the protrusion can further increase the coating thickness of corrosion inhibitor 48. Thus, the joint between joining surface 38 and conductive wire 28 can be protected by a thicker corrosion protection layer, and the connection reliability between voltage detection line 6 and busbar 10 can be further increased. Alternatively, the connection reliability between voltage detection line 6 and busbar 10 can be increased with a coating amount of corrosion inhibitor 48 being reduced.

Other Modified Examples

The number of cells 8 included in battery module 1 is not particularly limited. A structure of each part of cell stack 2 including a binding structure and the like for the plurality of cells 8 is not particularly limited. Cells 8 may each have a cylindrical shape, for example.

REFERENCE MARKS IN THE DRAWINGS

1 battery module
6 voltage detection line
8 cell
10 busbar
28 conductive wire
38 joining surface
44 position restriction part
48 corrosion inhibitor

The invention claimed is:

1. A busbar comprising:
   a joining surface to which a voltage detection line is to be joined;
   a position restriction part that is provided on at least a part of a periphery of the joining surface and configured to restrict spreading of a corrosion inhibitor that covers the joining surface;
   wherein the corrosion inhibitor is a liquid corrosion inhibitor in which a resin is dispersed in a solvent, and the corrosion inhibitor is subjected to a predetermined curing treatment to become a corrosion preventing layer; and
   the position restriction part is a recess recessed from the joining surface in a thickness direction of the busbar or a protrusion protruding from the joining surface in the thickness direction of the busbar.

2. The busbar according to claim 1, wherein the voltage detection line includes a conductive wire, the conductive wire to be joined to the joining surface and being made of copper, and the busbar is made of aluminum.

3. A battery module comprising:

a plurality of cells;

the bar according to claim 1, the busbar being configured to electrically connect the plurality of cells to each other; and a voltage detection line that is joined to the busbar and configured to detect voltages of the plurality of cells.

\* \* \* \* \*